United States Patent [19]
Wut et al.

[11] Patent Number: 6,104,140
[45] Date of Patent: Aug. 15, 2000

[54] MOTION ACTIVATED ILLUMINATING FOOTWEAR AND LIGHT MODULE THEREFOR WITH CONTINUOUS/ SEQUENTIAL OSCILLATING LIGHTS

[75] Inventors: Siu Bun Wut, Hong Kong, The Hong Kong Special Administrative Region of the People's Republic of China; Melvin C. Garner, Hartsdale, N.Y.

[73] Assignee: East Asia Services, Ltd., Hong Kong, The Hong Kong Special Administrative Region of the People's Republic of China

[21] Appl. No.: 09/106,702

[22] Filed: Jun. 29, 1998

Related U.S. Application Data

[63] Continuation-in-part of application No. 08/883,835, Jun. 27, 1997, Pat. No. 5,909,088.

[51] Int. Cl.[7] .................................................. H05B 37/00
[52] U.S. Cl. ..................... 315/200 A; 315/323; 36/137; 362/103
[58] Field of Search .................................. 362/103, 800; 36/137; 315/200 A, 225, 323, 362

[56] References Cited

U.S. PATENT DOCUMENTS

| | | | |
|---|---|---|---|
| 4,158,922 | 6/1979 | Dana, III | 362/103 |
| 4,253,253 | 3/1981 | McCormick | 36/137 |
| 4,848,009 | 7/1989 | Rodgers | 36/137 |
| 5,013,972 | 5/1991 | Malkieli et al. | 362/800 |
| 5,033,212 | 7/1991 | Evanyk | 362/103 |
| 5,188,447 | 2/1993 | Chiang et al. | 362/103 |
| 5,408,764 | 4/1995 | Wut | 36/137 |
| 5,438,488 | 8/1995 | Dion | 362/103 |
| 5,457,900 | 10/1995 | Roy | 36/137 |
| 5,566,479 | 10/1996 | Gray et al. | 36/137 |
| 5,599,088 | 2/1997 | Chien | 362/103 |
| 5,663,614 | 9/1997 | Weng et al. | 315/323 |
| 5,742,133 | 4/1998 | Wilhelm et al. | 362/800 |
| 5,746,499 | 5/1998 | Ratcliffe et al. | 362/103 |
| 5,903,103 | 5/1999 | Garner | 36/137 |
| 5,969,479 | 10/1999 | Wong | 362/103 |
| 6,012,822 | 1/2000 | Robinson | 315/200 A |

FOREIGN PATENT DOCUMENTS

| | | | |
|---|---|---|---|
| 0816754 | 1/1998 | European Pat. Off. | F21V 33/00 |
| 2722862 | 1/1996 | France | F21L 11/00 |
| WO9527417 | 10/1995 | WIPO | H05B 33/00 |

*Primary Examiner*—Don Wong
*Assistant Examiner*—Thuy Vinh Tran
*Attorney, Agent, or Firm*—Richard M. Goldberg

[57] ABSTRACT

A light module for use with a plurality of light sources mounted to footwear, includes a power supply, an oscillator circuit, a power supply transmission circuit and a switch. The oscillation circuit supplies power to the light sources to sequentially cause illumination of the light sources. The switch has an open condition and a closed condition. A power transistor of the power supply transmission circuit has an input connected with the switch, and an output path connected between the power supply and the oscillation circuit for supplying power from the power supply to the oscillation circuit when the switch is closed and for terminating over time the supply of power from the power supply to the oscillation circuit when the switch is open. A bypass circuit includes diodes connected between the oscillation circuit and the switch to disable the oscillation circuit in order to continuously illuminate the light sources when the switch is closed. The bypass circuit is disabled when the switch is open. A first capacitive device of the power supply transmission circuit is connected between the input and the output path of the power transistor for storing a charge when the switch is closed and for discharging through the output path of the power transistor when the switch is opened to cause the oscillation circuit to sequentially supply power to the light sources and sequentially cause illumination of the light sources until the stored charge of the first capacitive device falls below a predetermined value.

20 Claims, 7 Drawing Sheets

MOTION ACTIVATED ILLUMINATING FOOTWEAR AND LIGHT MODULE THEREFOR WITH CONTINUOUS/ SEQUENTIAL OSCILLATING LIGHTS

REFERENCE TO RELATED APPLICATION

The present application is a Continuation-In-Part of U.S. patent application Ser. No. 08/883,835, filed Jun. 27, 1997, now U.S. Pat. No. 5,909,088 and entitled MOTION ACTIVATED ILLUMINATING FOOTWEAR AND LIGHT MODULE THEREFOR WITH SEQUENTIAL OSCILLATING LIGHTS.

BACKGROUND OF THE INVENTION

This invention relates to footwear, and more particularly, is directed to motion activated illuminating footwear having a light module therein.

It is well known to position a light inside of a heel of footwear, with the light being activated all of the time. In such known construction, the light can be turned off by means of a switch extending from the heel of the footwear. See, for example, U.S. Pat. No. 4,253,253 to McCormick. However, this construction provides certain disadvantages. First, there is the possibility that the switch is not turned off, in which case the light will burn out in a very short period of time. Second, a connection must be made between the switch on the outside of the heel to the circuitry within the heel, which adds to the cost and complexity of the footwear. Third, there is the possibility that the switch can be damaged, for example, by banging the shoe against an object, since the switch is externally accessible.

For the above reasons, it is preferred to position the entire circuitry and switch therefor entirely within the heel of the footwear. In this regard, it is well known to position a light, such as a light emitting diode (LED) inside of the heel of footwear, such that the light is visible from the exterior of the footwear, with the light being activated by means of a pressure sensitive switch. In particular, when the wearer steps down and exerts pressure on the pressure sensitive switch when walking or running, a circuit is closed so as to supply power to activate the LED. When the wearer steps up, relieving pressure from the pressure sensitive switch, the circuit is opened so as disconnect power to the LED. Examples of such footwear are disclosed in U.S. Pat. No. 5,188,447 to Chiang et al, European Patent Application No. 0 121 026, and U.S. Pat. No. 3,800,133 to Duval. However, the use of a pressure sensitive switch and the associated circuit connections increases the cost and complexity of the footwear.

It is also known to position a light inside of the heel of footwear, with the light being activated by a mercury tilt switch in the footwear. See, for example, German Offenlegungsschrift No. 2,608,485, the aforementioned European Patent Application No. 0 121 026, U.S. Pat. No. 4,158,922 to Dana, III, U.S. Pat. No. 4,848,009 to Rodgers and U.S. Pat. No. 3,893,247 to Dana, III. However, the addition of the mercury tilt switch and the associated circuitry greatly adds to the cost and complexity of the footwear.

U.S. Pat. No. 5,408,764 to Wut, the entire disclosure of which is incorporated herein by reference, discloses the use of an LED inside of the heel of a shoe, which is intermittently activated by movement of the shoe. Specifically, when the shoe is moved, the free end of a coil spring which is fixed in a cantilevered manner, is caused to intermittently complete the electrical circuit to supply current to the LED.

It is further known to provide oscillating or sequential illumination of LEDs. For example, in U.S. Pat. No. 5,438,488 to Dion, six LEDs are distributed along a plastic strip of the sneaker between the crossed laces, each of which is turned on in sequence so as to give the appearance of a light traveling along the strip as the LEDs are successively turned on. In order to accomplish this purpose, a decade counter has six outputs, each being connected to a respective LED to provide such sequential lighting. However, since the LEDs are controlled to operate sequentially and thereby produce a sequential "flashing" effect, there is no need to provide a pressure sensitive switch, mercury tilt switch or coil switch, as indicated above, to provide alternating power to the circuit. In other words, in the aforementioned circuits, the switches are activated to turn on and off in response to movement of the shoe in order to produce the flashing effect, while Dion produces the flashing effect by reason of the decade counter so that there would be no reason to provide any of the aforementioned movement sensitive switches for powering the decade counter in Dion. See also U.S. Pat. No. 5,599,088 which discusses an alternative to a motion sensitive switch, that is, flashing LEDs based on a predetermined pattern.

Other circuits which provide alternating or sequential flashing of LEDs are known in conjunction with capacitors which charge and discharge to activate the respective LEDs. See, for example, U.S. Pat. No. 2,916,670 to Pederson for a static flasher system; U.S. Pat. No. 5,013,972 to Malkieli et al for another static flasher system for use with a symbolic/religious memorial light; U.S. Pat. No. 2,960,627 to Hunt; and U.S. Pat. No. 3,631,359 to Jones. However, none of these patents discloses use of such a circuit with a shoe or with a motion sensitive switch for powering the oscillation circuit.

OBJECTS AND SUMMARY OF THE INVENTION

Accordingly, it is an object of the present invention to provide motion activated illuminating footwear that overcomes the problems with the aforementioned prior art.

It is another object of the present invention to provide motion activated illuminating footwear in which a plurality of lights are caused to sequentially or alternately illuminate.

It is still another object of the present invention to provide motion activated illuminating footwear in which an oscillation circuit provides alternate illumination of LEDs and is powered by a motion sensitive switch in the footwear.

It is still another object of the present invention to provide motion activated illuminating footwear in which the oscillation circuit includes capacitive elements which charge and discharge to provide the alternating illumination effect.

It is a further object of the present invention in which the motion sensitive switch that powers the oscillation circuit is a cantilevered coil switch.

It is a still further object of the present invention to provide motion activated illuminating footwear in which the LEDs are continuously illuminated when the switch is closed, due to a bypass diode circuit, and in which an oscillation circuit provides alternate illumination of the LEDs for a short period of time when the switch is opened.

In accordance with an aspect of the present invention, a light module for use with a plurality of light sources mounted to footwear, includes a power supply for supplying power, and an oscillation circuit for supplying power to the light sources to sequentially cause illumination of the light sources. A switch has an open condition and a closed condition, and a power supply transmission circuit is connected between the power supply, the switch and the oscillation circuit for supplying power from the power supply to the oscillation circuit when the switch is closed and for ending the supply of power from the power supply to the oscillation circuit when the switch is open. A bypass circuit is connected between the oscillation circuit and the switch to disable the oscillation circuit and continuously illuminate the light sources when the switch is closed, the bypass circuit being disabled when the switch is open. A first capacitive device is connected with the power supply transmission circuit for storing a charge when the switch is closed and for discharging through the power supply transmission circuit when the switch is opened to cause the oscillation circuit to sequentially supply power to the light sources and sequentially cause illumination of the light sources until the stored charge of the first capacitive device falls below a predetermined value.

The oscillation circuit includes first and second transistors, each having an input connected to the power supply transmission circuit, and an output path, a first series connection of the output path of the first transistor with a first one of the light sources, a second series connection of the output path of the second transistor with a second one of the light sources, with the series connections being connected in parallel with each other and between the power supply and the power supply transmission circuit, and second and third capacitive devices, the second capacitive device being connected between the input of the first transistor and the output path of the second transistor, and the second capacitive circuit being connected between the input of the second transistor and the output path of the first transistor.

The bypass circuit includes a diode connected between a junction of the output path of one of the first and second transistors with the respective one of the first and second light sources, and the switch. Specifically, the bypass circuit includes a first diode connected between a junction of the output path of the first transistor with the first light source, and the switch; and a second diode connected between a junction of the output path of the second transistor with the second light source, and the switch.

Each of the first, second and third capacitive devices includes a capacitor. A first resistive circuit is connected between the input of the first transistor and the power supply transmission circuit; and a second resistive circuit is connected between the input of the second transistor and the power supply transmission circuit.

The power supply transmission circuit includes a transistor having an input connected with the switch, and an output path connected between the power supply and the oscillation circuit. The first capacitive device is connected between one terminal of the power supply and the input of the transistor.

The switch includes a motion activated switch connected between an opposite terminal of the power supply and the input of the transistor and which alternately opens and closes a connection between the power supply and the input of the transistor during movement of the light module and which opens the connection between the power supply and the input of the transistor when the light module stops moving. Specifically, the motion activated switch includes a spring switch connected in a cantilevered manner such that one end of the spring switch is electrically connected to one of the power supply and the power supply transmission circuit, and an opposite free end of the spring switch intermittently electrically connects with the other of the power supply and the power supply transmission circuit during movement of the light module.

Each light source includes a light emitting diode.

The above and other objects, features and advantages of the invention will become readily apparent from the following detailed description thereof which is to be read in connection with the accompanying drawings.

DETAILED DESCRIPTION OF THE PREFERRED EMBODIMENTS

Figure 1:
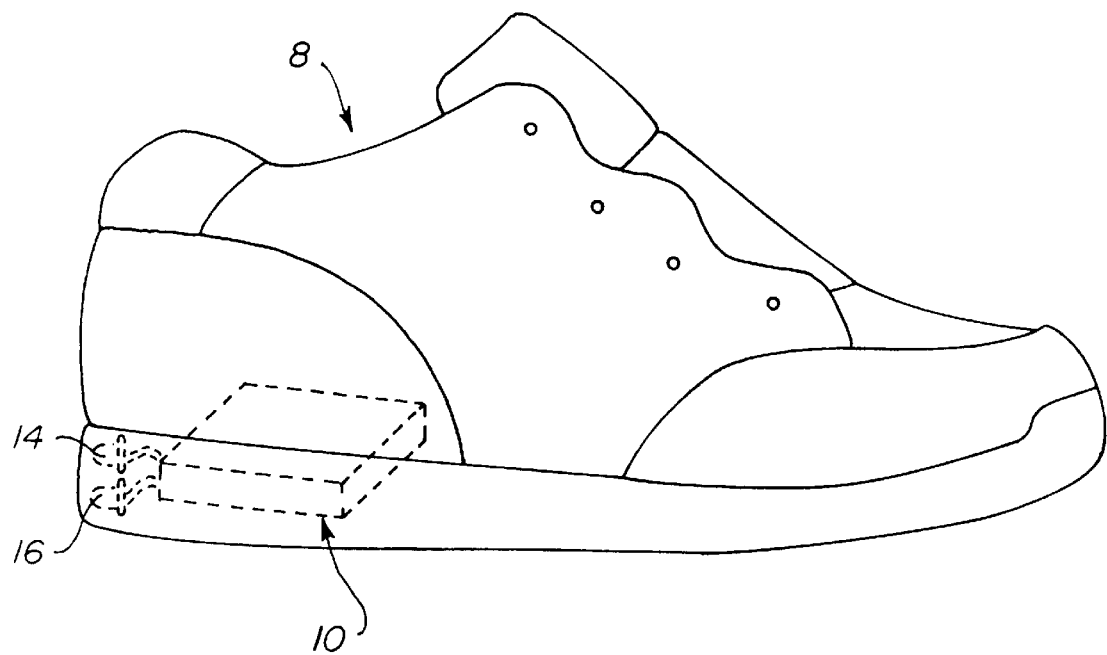
FIG. 1 is a perspective view of a running shoe, with the location of the light module shown in phantom therein.
Figure 2:
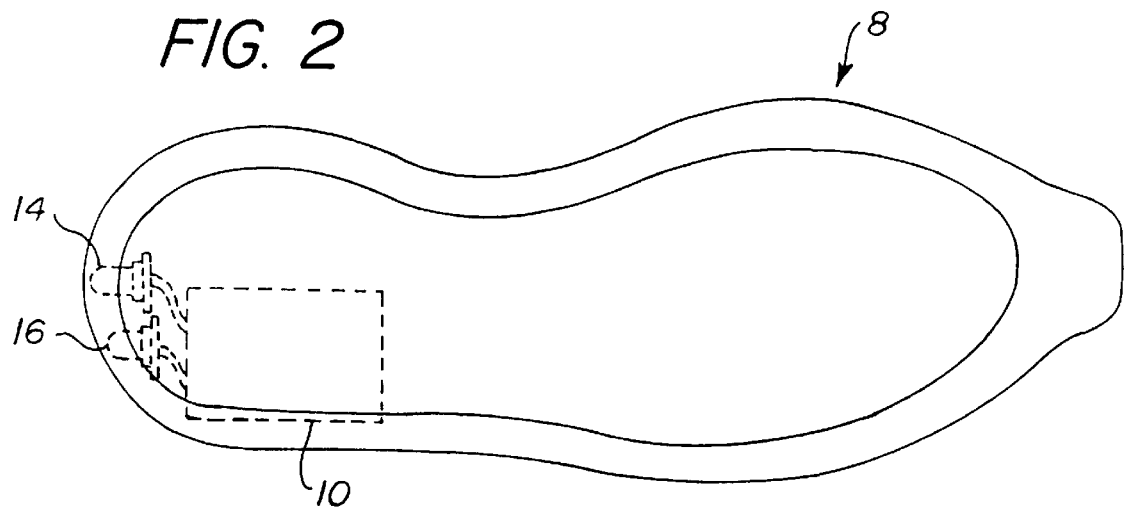
FIG. 2 is a bottom plan view of the running shoe of FIG. 1, with the light module shown in phantom therein.
Figure 3:
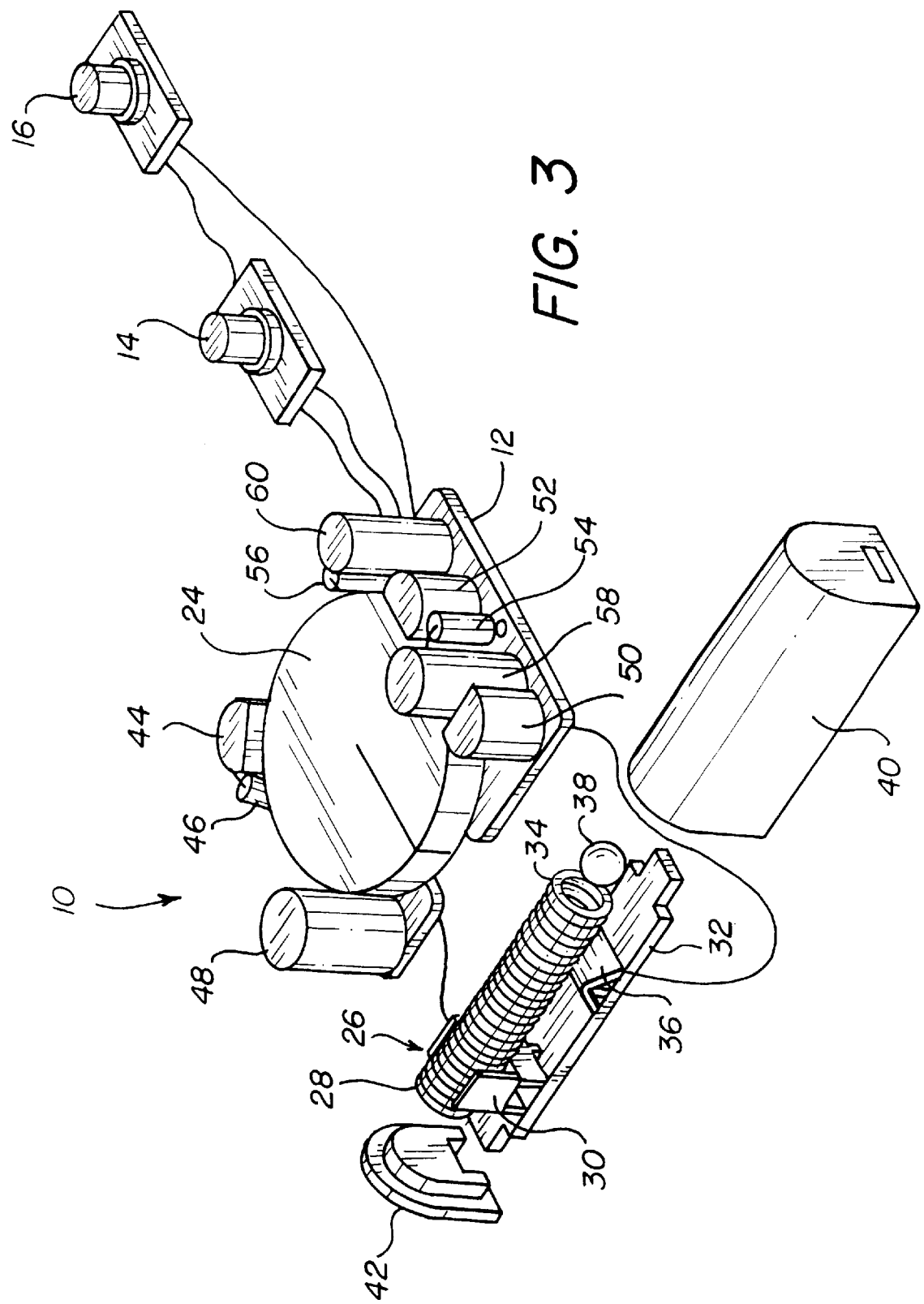
FIG. 3 is a partially exploded perspective view of a light module of the motion activated illuminating footwear according to one embodiment of the present invention.
Figure 4:
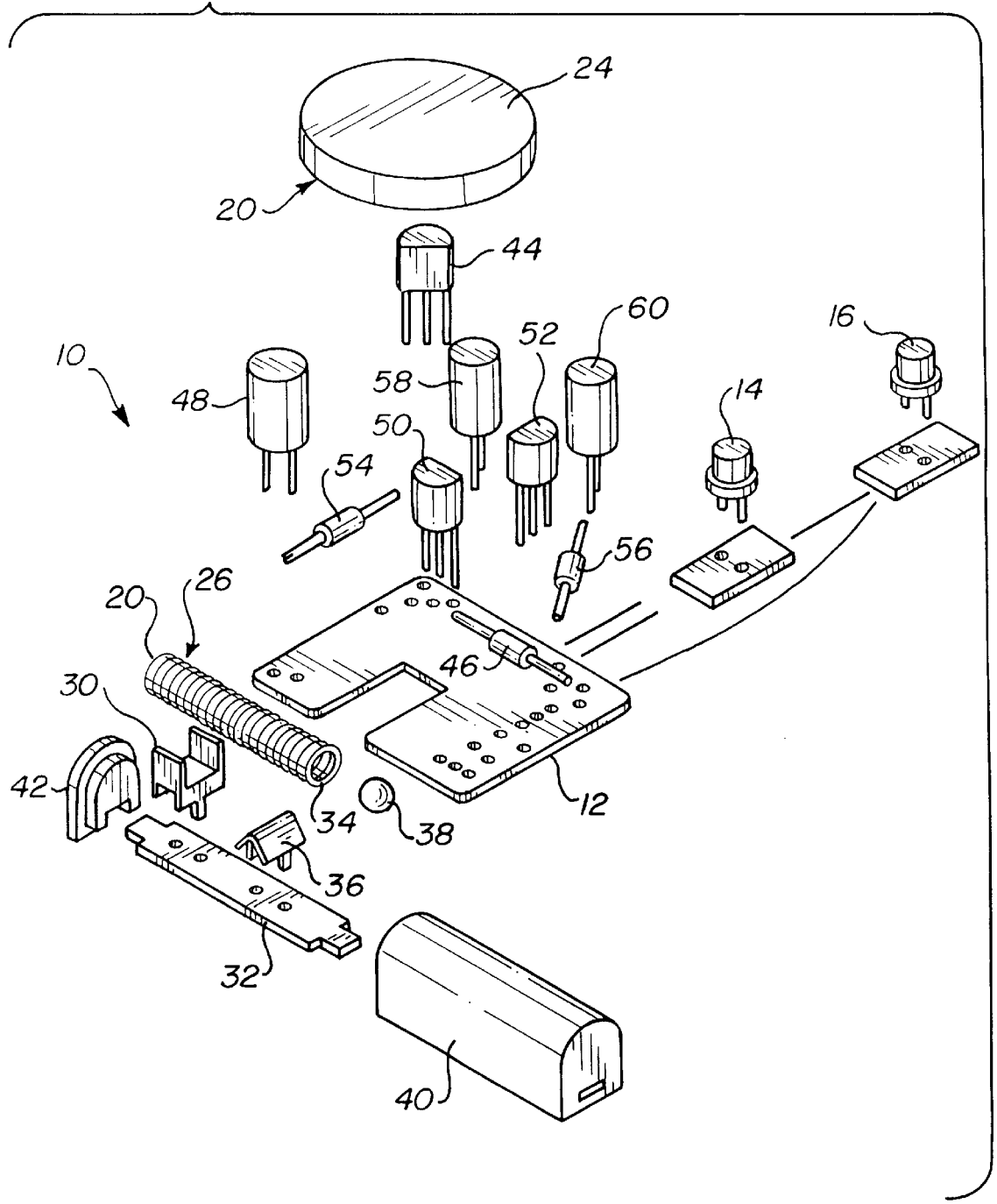
FIG. 4 is a fully exploded perspective view of the light module of FIG. 3.

Referring to the drawings in detail, and initially to FIGS. 1–5 thereof, footwear 8 such as a running shoe or the like includes a light module 10, according to a first embodiment of the present invention, incorporated into the heel of the footwear, in a similar manner to U.S. Pat. No. 5,408,764.

Light module 10 includes a printed circuit board 12 having various electrical components mounted thereon. Specifically, and referring to FIGS. 3–5, light module 10 includes first and second LEDs 14 and 16 which are sequentially or alternately illuminated by an oscillation circuit 18 that is powered by a power supply 20 through a motion sensitive switch circuit 22, as shown best in FIG. 5.

Specifically, power supply 20 can be comprised of a three volt battery 24 which is mounted on printed circuit board 12.

Motion sensitive switch circuit 22 is formed by a coil spring 26 having one end 28 thereof fixedly mounted to a spring holder 30 which, in turn, is mounted to one end of an elongated printed circuit board 32. The opposite end 34 of coil spring 26 is free, such that coil spring 26 is mounted in a cantilevered manner on printed circuit board 32. The opposite free end 34 of coil spring 26 is mounted in spaced relation above a metal arch 36 that is fixed to the opposite end of printed circuit board 32. A weighting ball 38 is secured to the free end 34 of coil spring 26. In the stationary position of footwear 8, free end 34 is positioned slightly above, but in spaced relation to, metal arch 36. Spring holder 30, and thereby the fixed end 28 of coil spring 26, are connected by an electric wire to printed circuit board 12, while metal arch 36, and thereby free end 34 of coil spring 26 when it contacts metal arch 36, are also connected by an electric wire to printed circuit board 12.

Coil spring 26 and printed circuit board 32 are enclosed by an arcuate spring housing 40 having an end closure cap 42. Printed circuit board 32 can be secured to spring housing 40 and end closure 42 to provide a unitary assembly.

Figure 5:
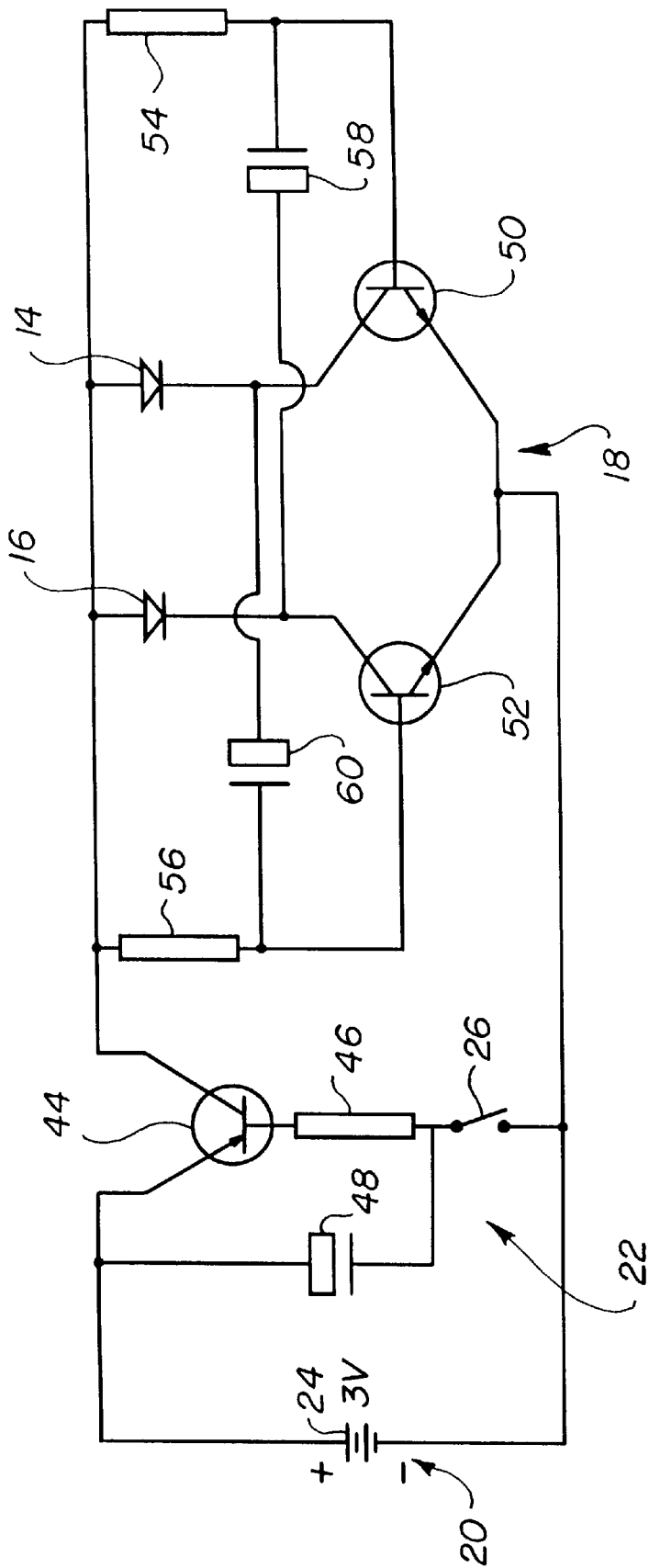
FIG. 5 is a circuit wiring diagram showing the equivalent electrical circuitry for the light module of FIG. 3.

As shown in FIG. 5, motion sensitive switch also includes a transistor 44 having its emitter-collector path connected between the positive terminal of power supply 20 and oscillation circuit 18, and its base connected to the negative terminal of power supply 30 through a series circuit of a resistor 46 and coil spring 26. Further, a capacitor 48 is connected in parallel with the series circuit of resistor 46 and the emitter-base path of transistor 44. In other words, one terminal of capacitor 48 is connected to the junction between resistor 46 and coil spring 26, and the other terminal of capacitor 48 is connected to the junction between the emitter of transistor 44 and the positive terminal of power supply 20.

With this arrangement, when free end 34 of coil spring 26 contacts metal arch 36 so as to close switch circuit 22, capacitor 48 will be charged and will build up a voltage at the base terminal of transistor 44. As a result, transistor 44 will turn on, causing current to flow through the emitter-collector path of transistor 44, which will be supplied to oscillation circuit 18. When free end 34 of coil spring 26 is out of contact with metal arch 36, the charge on capacitor 48 will maintain transistor 44 in an on condition so that current will still flow through the emitter-collector path thereof to oscillation circuit 18. Therefore, alternate contact of free end 34 with arch 36 will result in transistor 44 being maintained in an on condition.

When the shoe is stationary for a period of time, capacitor 48 will discharge through the base of transistor 44, thereby maintaining transistor 44 in an on condition until the charge on capacitor 48 falls below the threshold value necessary to turn transistor on, at which time transistor 44 will turn off, thereby closing the emitter-collector path thereof and preventing the supply of current to oscillation circuit 18.

Oscillation circuit 18 includes two transistors 50 and 52 having their emitters connected together and also connected to the negative terminal of power supply 20. The base of transistor 50 is connected to the collector-emitter path of transistor 44 through a resistor 54, while the base of transistor 52 is connected to the collector-emitter path of transistor 44 through a resistor 56. The collector of transistor 50 is connected to the cathode of LED 14, with the anode thereof connected to the collector-emitter path of transistor 44, while the collector of transistor 52 is connected to the cathode of diode 16, with the anode thereof connected to the collector-emitter path of transistor 44.

Finally, a capacitor 58 is connected between the base of transistor 50 and the collector of transistor 52, while a capacitor 60 is connected between the base of transistor 52 and the collector of transistor 50. Capacitors 58 and 60 have different charging times.

With power being supplied to oscillation circuit 18, transistors 50 and 52 will both try to turn on. This will cause current to start to flow through LED 14 and the collector-emitter path of transistor 50 so as to start to illuminate LED 14 and, at the same time, since transistor 52 is also trying to turn on, current will flow through LED 16 and the collector-emitter path of transistor 52 to start to illuminate LED 16. The effect of this is to reduce the collector-emitter voltage of both transistors.

If it is assumed that transistor 52 reaches saturation first, its collector-emitter voltage is so low and the capacitor 58 has had so little time to charge, that the resulting voltage on the base of transistor 50 becomes too low to keep it on. As a result, transistor 50 turns off and most of the charge on capacitor 60 is dissipated because the voltage on both sides of that capacitor will be at the supply voltage level. With transistor 50 off and transistor 52 on, capacitor 58 charges and the voltage on the base of transistor 50 increases until it turns on. When transistor 50 turns on, its collector-emitter voltage drops very low, which in turn causes the voltage on the base of transistor 52 to drop, cutting the transistor off. With transistor 52 off, capacitor 60 begins to charge until transistor 52 turns on again, which has the effect of turning transistor 50 off. This alternating turning on and off of transistors 50, 52 repeats at a rate determined by the time constant of resistor 56 and capacitor 60 for one half of the cycle and resistor 54 and capacitor 58 for the other half cycle.

As a result, LEDs 14 and 16 are alternately or sequentially illuminated, as long as power is supplied to the circuit, that is, as long as motion sensitive switch 22 supplies power to oscillation circuit 18.

When the free end of coil spring 26 is out of contact with arch 36 for a long enough period of time, that is, when the shoe is stationary, the charge on capacitor 48 is reduced to a level to turn off transistor 44 so that there is no power supplied to oscillation circuit 18. At this time, oscillation circuit 18 will stop operating.

While the shoe is in motion, the switch may bounce, making periodic contact. As long as this contact is more frequent than the discharge rate of capacitor 48, the transistor 44 will remain on, supplying power to the oscillator circuit, so that LEDs 14 and 16 will continue to oscillate, that is, flash on and off alternately.

Thus, the only time that LEDs 14 and 16 stop the alternating illumination is when there is a transition of switch circuit 22 from an on state to an off state, and capacitor 48 has discharged enough to cause transistor 44 to turn off.

Figure 6:
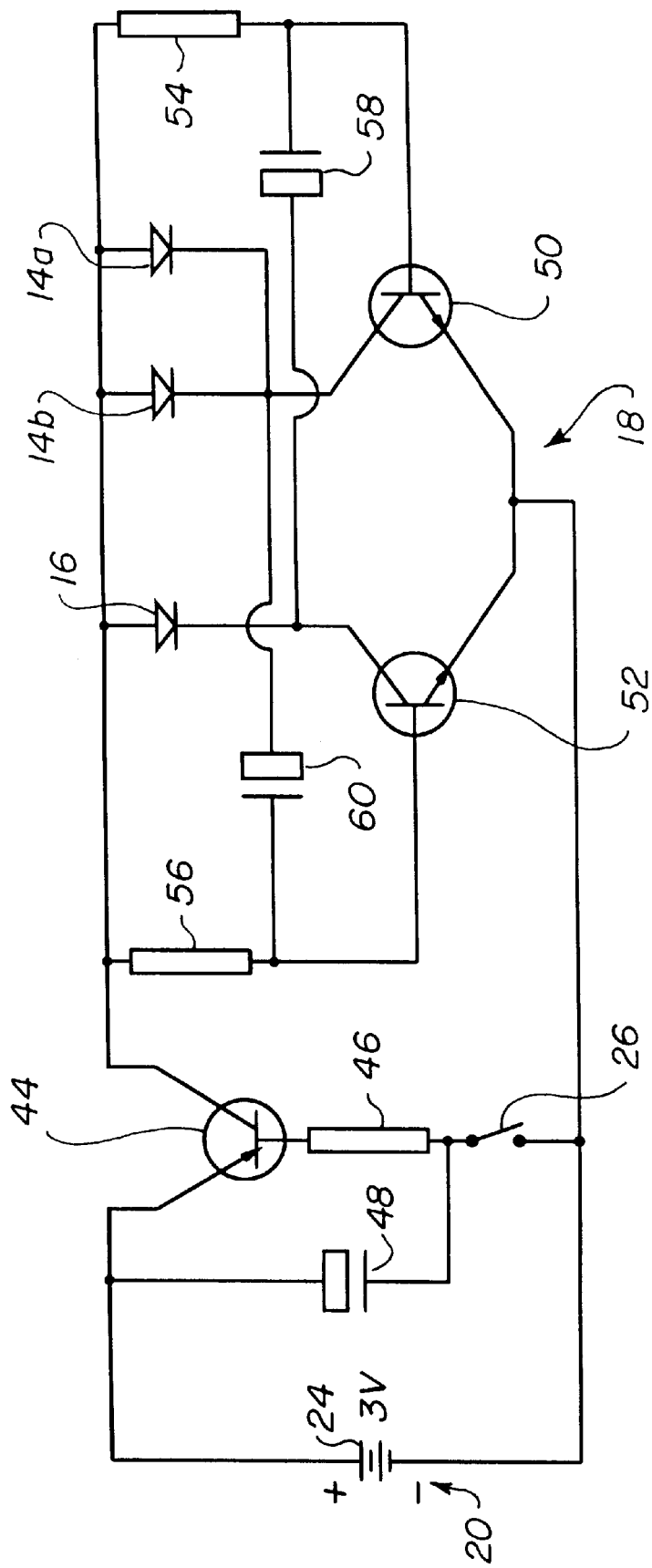
FIG. 6 is a circuit wiring diagram showing electrical circuitry of a light module according to another embodiment of the present invention.

Referring to FIG. 6, there is shown a modification of the circuit of FIG. 5 in that two LEDs 14*a* and 14*b* are provided in parallel, in place of the single LED 14 of FIG. 5. With this circuit, LEDs 14*a* and 14*b* are illuminated together and alternate with LED 16. In other words, LED 16 is first illuminated, followed by both LEDs 14*a* and 14*b*, then followed by LED 16, and so on.

Figure 7:
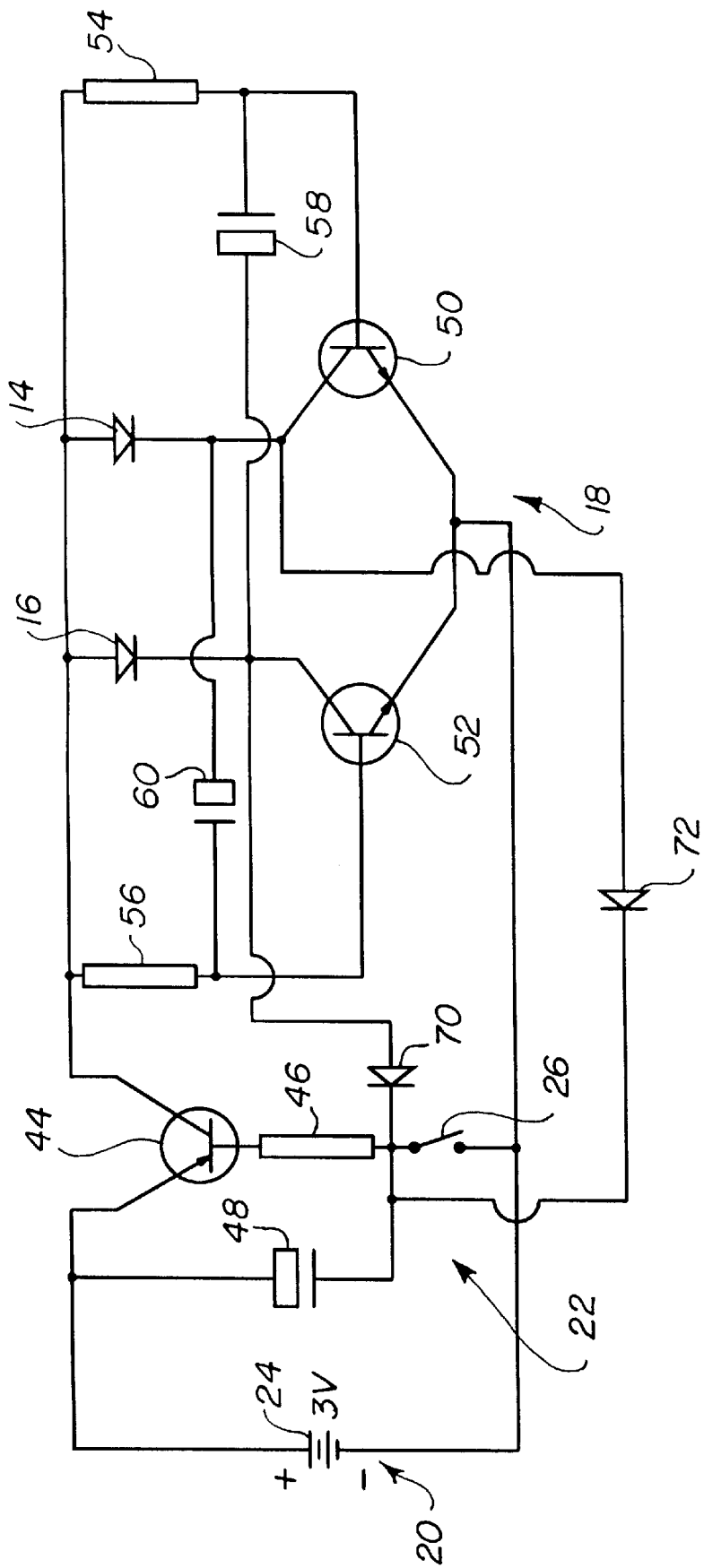
FIG. 7 is a circuit wiring diagram showing a modification of the circuit of FIG. 5 according to another embodiment of the present invention.

Referring to FIG. 7, there is shown a modification of the circuit of FIG. 5 in that a diode 70 is connected between the junction of resistor 46 and switch 26 and the junction of the collector of transistor 52 and LED 16. In addition, a diode 72 is connected between the junction of resistor 46 and switch 26 and the junction of the collector of transistor 50 and LED 14. Diodes 70 and 72 constitute bypass circuits.

By use of the extra diodes 70 and 72 in FIG. 7, which are connected between the collectors of the transistors 52 and 50 of the oscillation circuit at one end, and the junction of coil spring switch 26 with capacitor 48 at the other end, when coil spring switch 26 is closed, there will be a constant illumination of LEDs 14 and 16, that is, oscillation circuit 18 will not function to provide oscillation, but will continuously illuminate LEDs 14 and 16. This is because there will be a path from the positive terminal of battery 24 through transistor 44, LEDs 14, 16; diodes 70, 72; and switch 26 to the negative side of the battery 20. The effect is to continuously illuminate LEDs 14 and 16.

When coil spring switch 26 is opened, diodes 14 and 16 function to block current flowing therethrough, that is, since switch 26 is opened, the circuit through diodes 14 and 16 is open. However, power is supplied to the oscillating circuit because the stored charge in capacitor 48 holds transistor 44 on. Accordingly, since there is no bypass through diodes 70 and 72, oscillation circuit 18 functions as an oscillation circuit in order to provide oscillation of LEDs 14 and 16 therein, during discharge of capacitor 48. Thus, current flow is through LEDs 14 and 16 and the collector-emitter paths of transistors 50 and 52 of oscillation circuit 18. When the charge on capacitor 48 reduces to a certain level, power transistor 44 will turn off and cut off power to oscillation circuit 18.

Thus, the circuit of FIG. 7 operates to continuously illuminate LEDs 14 and 16 as long as switch 26 is closed and to illuminate LEDs in a predetermined sequence upon opening of switch 26. As the charge on capacitor 48 discharges, the voltage at the collector of transistor 44 reduces. If capacitor 48 is relatively large, so that it takes at least a couple of seconds to discharge, while the LEDs alternately flash due to the operation of the oscillator circuit 18, the intensity of the flashes will decrease. The result is a fading alternating flashing effect.

Figure 8:
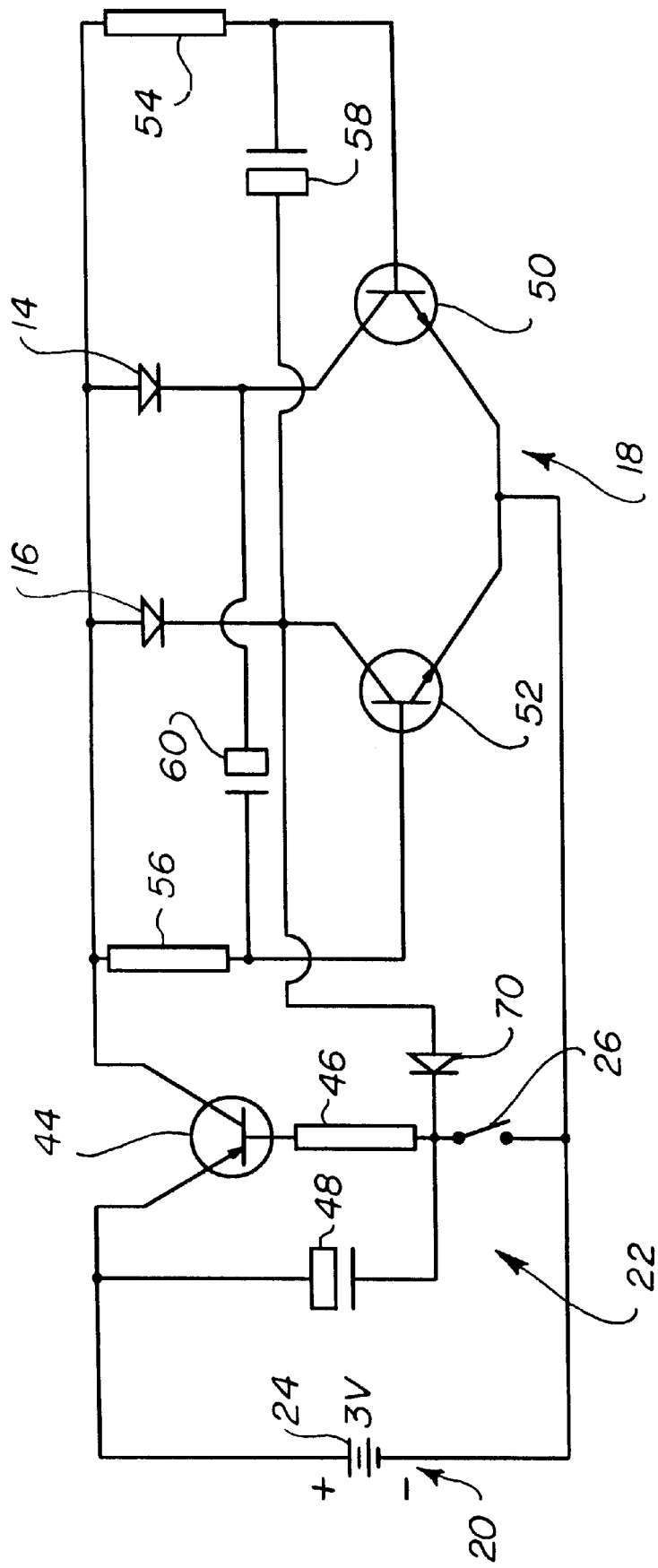
FIG. 8 is a circuit wiring diagram showing a modification of the circuit of FIG. 5 according to still another embodiment of the present invention.

The same result shown in FIG. 7 can also be achieved by the circuit in FIG. 8 in which only one diode 70 is provided, that is, with diode 72 eliminated, although it is preferred to have both diodes 70 and 72. Alternatively, diode 72 can be provided and diode 70 eliminated.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A light module for use with a plurality of light sources mounted to footwear, comprising:

a power supply for supplying power;

an oscillation circuit for supplying power to said light sources to sequentially cause illumination of said light sources;

a switch having an open condition and a closed condition;

a power supply transmission circuit connected between said power supply, said switch and said oscillation circuit for supplying power from said power supply to said oscillation circuit when said switch is closed and for ending the supply of power from said power supply to said oscillation circuit when said switch is open;

a bypass circuit connected between said oscillation circuit and said switch to disable said oscillation circuit and continuously illuminate said light sources when said switch is closed, said bypass circuit being disabled when said switch is open; and a first capacitive device connected with said power supply transmission circuit for storing a charge when said switch is closed and for discharging through said power supply transmission circuit when said switch is opened to cause said oscillation circuit to sequentially supply power to said light sources and sequentially cause illumination of said light sources until the stored charge of said first capacitive device falls below a predetermined value.

2. A light module according to claim 1, wherein said oscillation circuit includes:

first and second transistors, each having an input connected to said power supply transmission circuit, and an output path, a first series connection of the output path of the first transistor with a first one of said light sources, a second series connection of the output path of said second transistor with a second one of said light sources, with said series connections being connected in parallel with each other and between said power supply and said power supply transmission circuit, and second and third capacitive devices, said second capacitive device being connected between the input of said first transistor and the output path of said second transistor, and the second capacitive circuit being connected between the input of said second transistor and the output path of said first transistor.

3. A light module according to claim 2, wherein said bypass circuit includes a diode connected between a junction of the output path of one of said first and second transistors with the respective one of said first and second light sources, and said switch.

4. A light module according to claim 2, wherein said bypass circuit includes:

a first diode connected between a junction of the output path of said first transistor with said first light source, and said switch; and a second diode connected between a junction of the output path of said second transistor with said second light source, and said switch.

5. A light module according to claim 2, wherein each of said first, second and third capacitive devices includes a capacitor.

6. A light module according to claim 2, further comprising:

a first resistive circuit connected between the input of said first transistor and said power supply transmission circuit; and a second resistive circuit connected between the input of said second transistor and said power supply transmission circuit.

7. A light module according to claim 1, wherein said power supply transmission circuit includes a power transmission transistor having an input connected with said switch, and an output path connected between said power supply and said oscillation circuit.

8. A light module according to claim 7, wherein said first capacitive device is connected between one terminal of said power supply and the input of said power transmission transistor.

9. A light module according to claim 8, wherein said switch includes a motion activated switch connected between an opposite terminal of said power supply and the input of said power transmission transistor and which alternately opens and closes a connection between said power supply and said input of said power transmission transistor during movement of said light module and which opens the connection between said power supply and said input of said power transmission transistor when said light module stops moving.

10. A light module according to claim 1, wherein said switch includes a motion activated switch connected between said power supply and said power supply transmission circuit to alternately open and close a connection between said power supply and said power supply transmission circuit during movement of said light module and to open the connection between said power supply and said power supply transmission circuit when said light module stops moving.

11. A light module according to claim 10, wherein said motion activated switch includes a spring switch connected in a cantilevered manner such that one end of said spring switch is electrically connected to one of said power supply and said power supply transmission circuit, and an opposite free end of said spring switch intermittently electrically connects with the other of said power supply and said power supply transmission circuit during movement of the light module.

12. A light module according to claim 1, wherein each said light source includes a light emitting diode.

13. A light module for use with a plurality of light sources mounted to footwear, comprising:

a power supply for supplying power;

an oscillation circuit for supplying power to said light sources to sequentially cause illumination of said light sources, said oscillation circuit including:
 first and second transistors, each having an input and an output path,
 a first series connection of the output path of the first transistor with a first one of said light sources,
 a second series connection of the output path of said second transistor with a second one of said light sources, with said series connections being connected in parallel with each other and with said power supply, and
 second and third capacitive devices, said second capacitive device being connected between the input of said first transistor and the output path of said second transistor, and the second capacitive circuit being connected between the input of said second transistor and the output path of said first transistor;

a switch having an open condition and a closed condition;

a power supply transmission circuit connected with said power supply, said switch, and the first and second series connections and the inputs of said first and second transistors of said oscillation circuit for supplying power from said power supply to said oscillation circuit when said switch is closed and for ending the supply of power from said power supply to said oscillation circuit when said switch is open, said power supply transmission circuit including a third transistor having an input connected with said switch, and an output path connected between said power supply and said oscillation circuit;

a bypass circuit connected between said oscillation circuit and said switch to disable said oscillation circuit and continuously illuminate said light sources when said switch is closed, said bypass circuit being disabled when said switch is open; and a first capacitive device connected with said power supply transmission circuit for storing a charge when said switch is closed and for discharging through said power supply transmission circuit when said switch is opened to cause said oscillation circuit to supply power to said light sources and cause illumination of said light sources until the stored charge of said first capacitive device falls below a predetermined value.

14. A light module according to claim 13, wherein said bypass circuit includes a diode connected between a junction of the output path of one of said first and second transistors with the respective one of said first and second light sources, and said switch.

15. A light module according to claim 13, wherein said bypass circuit includes:
 a first diode connected between a junction of the output path of said first transistor with said first light source, and said switch; and
 a second diode connected between a junction of the output path of said second transistor with said second light source, and said switch.

16. A light module according to claim 13, further comprising:
 a first resistive circuit connected between the input of said first transistor and said power supply transmission circuit; and
 a second resistive circuit connected between the input of said second transistor and said power supply transmission circuit.

17. A light module according to claim 13, wherein said first capacitive device is connected between one terminal of said power supply and the input of said third transistor.

18. A light module according to claim 17, wherein said switch includes a motion activated switch connected between an opposite terminal of said power supply and the input of said third transistor and which alternately opens and closes a connection between said power supply and said input of said third transistor during movement of said light module and which opens the connection between said power supply and said input of said third transistor when said light module stops moving.

19. A light module according to claim 18, wherein said motion activated switch includes a spring switch connected in a cantilevered manner such that one end of said spring switch is electrically connected to one of said power supply and said power supply transmission circuit, and an opposite free end of said spring switch intermittently electrically connects with the other of said power supply and said power supply transmission circuit during movement of the light module.

20. A light module according to claim 13, wherein each said light source includes a light emitting diode.

* * * * *